US008996232B2

(12) United States Patent
Dwan et al.

(10) Patent No.: US 8,996,232 B2

(45) **Date of Patent: *Mar. 31, 2015**

(54) WIRELESS VEHICLE SERVICING

(71) Applicant: Ford Global Technologies, LLC, Dearborn, MI (US)

(72) Inventors: Patrick Joseph Dwan, Canton, MI (US); Kenneth Dorony, South Lyon, MI (US); Darren Peter Shelcusky, Saline, MI (US); Henry Thomas Ubik, Grosse Pointe Park, MI (US); Timothy Brian DeBorde, Carleton, MI (US); Radhakrishnan Swaminathan, Grand Blanc, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/922,301

(22) Filed: Jun. 20, 2013

(65) Prior Publication Data

US 2013/0282254 A1 Oct. 24, 2013

Related U.S. Application Data

(63) Continuation of application No. 12/773,997, filed on May 5, 2010, now Pat. No. 8,498,771.

(51) Int. Cl.

| | |
|---|---|
| ***G01M 17/00*** | (2006.01) |
| ***G07C 5/00*** | (2006.01) |
| *G07C 5/08* | (2006.01) |

(52) U.S. Cl.

CPC .............. *G07C 5/008* (2013.01); *G07C 5/0808* (2013.01)

USPC ....... 701/29.1; 701/29.6; 701/31.4; 701/31.5; 701/32.2

(58) Field of Classification Search

USPC ............ 701/29.1, 29.6, 31.4, 31.5, 32.2, 32.4

See application file for complete search history.

(56) References Cited

U.S. PATENT DOCUMENTS

| | | | |
|---|---|---|---|
| 5,781,125 | A | 7/1998 | Godau et al. |
| 5,922,041 | A | 7/1999 | Anderson |

(Continued)

FOREIGN PATENT DOCUMENTS

| | | | |
|---|---|---|---|
| JP | 9264819 | A | 10/1997 |
| JP | 11326140 | A | 11/1999 |
| JP | 2006018680 | A | 1/2006 |

OTHER PUBLICATIONS

Ford Motor Company, "Navigation System: SYNC," Owner's Guide Supplement, SYNC Version 1 (Jul. 2007).

(Continued)

*Primary Examiner* — Toan To

(74) *Attorney, Agent, or Firm* — Jennifer M. Stec; Brooks Kushman P.C.

(57) ABSTRACT

Various embodiments include methods, systems, and computer-program products for wireless vehicle servicing. Instructions for performing a vehicle servicing operation may be received at a servicing terminal. Further, vehicle servicing operation data based on the instructions and data communication rules for communicating data to a vehicle computing system may be received. Servicing request data stored in computer-readable media may be generated and may include the vehicle servicing operation data and the one or more data communication rules. The servicing request data may be transmitted to the vehicle computing system and servicing return data may be received. Servicing status information may be presented on the servicing terminal based on the servicing return data.

18 Claims, 5 Drawing Sheets

(56) References Cited

U.S. PATENT DOCUMENTS

| | | | | |
|---|---|---|---|---|
| 6,064,322 | A | 5/2000 | Ohira | |
| 6,337,621 | B1 | 1/2002 | Ogino et al. | |
| 6,434,455 | B1 | 8/2002 | Snow et al. | |
| 6,553,292 | B2 | 4/2003 | Kokes et al. | |
| 6,598,183 | B1 | 7/2003 | Grieco et al. | |
| 6,603,394 | B2 | 8/2003 | Raichle et al. | |
| 6,611,740 | B2 | 8/2003 | Lowrey et al. | |
| 6,636,790 | B1 | 10/2003 | Lightner et al. | |
| 6,687,587 | B2 | 2/2004 | Kacel | |
| 6,738,697 | B2 | 5/2004 | Breed | |
| 6,978,198 | B2 | 12/2005 | Shi | |
| 7,146,307 | B2 | 12/2006 | Mocek | |
| 7,155,321 | B2 * | 12/2006 | Bromley et al. | 701/29.6 |
| 7,228,211 | B1 | 6/2007 | Lowrey et al. | |
| 7,277,780 | B2 | 10/2007 | Meier-Arendt et al. | |
| 7,340,365 | B2 | 3/2008 | Wubbena et al. | |
| 7,343,526 | B2 | 3/2008 | Aditham | |
| 7,379,541 | B2 | 5/2008 | Iggulden et al. | |
| 7,487,074 | B2 | 2/2009 | Ohtsu et al. | |
| 7,590,476 | B2 | 9/2009 | Shumate | |
| 8,126,644 | B2 | 2/2012 | Amano | |
| 8,285,439 | B2 * | 10/2012 | Hodges | 701/31.5 |
| 8,296,007 | B2 * | 10/2012 | Swaminathan et al. | 701/29.1 |
| 8,498,771 | B2 * | 7/2013 | Dwan et al. | 701/29.1 |
| 2002/0035429 | A1 | 3/2002 | Banas | |
| 2002/0173885 | A1 | 11/2002 | Lowrey et al. | |
| 2003/0036832 | A1 | 2/2003 | Kokes et al. | |
| 2003/0163587 | A1 | 8/2003 | Knight et al. | |
| 2004/0044454 | A1 | 3/2004 | Ross et al. | |
| 2004/0054503 | A1 | 3/2004 | Namaky | |
| 2004/0128071 | A1 | 7/2004 | Schradi | |
| 2004/0194479 | A1 | 10/2004 | Umebayashi et al. | |
| 2005/0090939 | A1 | 4/2005 | Mills et al. | |
| 2005/0096020 | A1 | 5/2005 | Oesterling et al. | |
| 2006/0034231 | A1 | 2/2006 | Tailor | |
| 2006/0041348 | A1 | 2/2006 | Liebl et al. | |
| 2006/0130033 | A1 | 6/2006 | Stoffels et al. | |
| 2006/0229777 | A1 | 10/2006 | Hudson et al. | |
| 2007/0162796 | A1 | 7/2007 | Chan et al. | |
| 2007/0171029 | A1 | 7/2007 | Inbarajan | |
| 2007/0179799 | A1 | 8/2007 | Laghrari | |
| 2008/0015748 | A1 | 1/2008 | Nagy | |
| 2008/0027605 | A1 | 1/2008 | Oesterling et al. | |
| 2008/0027606 | A1 | 1/2008 | Helm | |
| 2008/0140281 | A1 | 6/2008 | Morris et al. | |
| 2008/0147267 | A1 * | 6/2008 | Plante et al. | 701/35 |
| 2008/0167056 | A1 | 7/2008 | Gilzean et al. | |
| 2008/0167078 | A1 | 7/2008 | Eibye | |
| 2008/0172357 | A1 | 7/2008 | Rechis et al. | |
| 2008/0216067 | A1 | 9/2008 | Villing | |
| 2008/0269975 | A1 | 10/2008 | Bertosa et al. | |
| 2009/0063038 | A1 | 3/2009 | Shrivathsan et al. | |
| 2009/0177352 | A1 * | 7/2009 | Grau et al. | 701/33 |
| 2009/0292416 | A1 | 11/2009 | Ubik et al. | |
| 2009/0308134 | A1 | 12/2009 | Pepper | |
| 2010/0042287 | A1 | 2/2010 | Zhang et al. | |
| 2010/0204878 | A1 | 8/2010 | Drew et al. | |
| 2010/0256861 | A1 | 10/2010 | Hodges | |
| 2011/0022422 | A1 | 1/2011 | Taylor | |
| 2011/0046883 | A1 | 2/2011 | Ross et al. | |
| 2012/0072055 | A1 | 3/2012 | Barlsen et al. | |

OTHER PUBLICATIONS

Ford Motor Company, "SYNC," Owner's Guide Supplement, SYNC Version 1 (Nov. 2007).
Ford Motor Company, "Navigation System: SYNC," Owner's Guide Supplement, SYNC Version 2 (Oct. 2008).
Ford Motor Company, "SYNC," Owner's Guide Supplement, SYNC Version 2 (Oct. 2008).
Ford Motor Company, "Navigation System: SYNC," Owner's Guide Supplement, SYNC Version 3 (Jul. 2009).
Ford Motor Company, "SYNC," Owner's Guide Supplement, SYNC Version 3 (Aug. 2009).
Dynetics Vehicle Data Recorder Models DVG-II and WDVG-II (2009) printout from www.dynetics-ia.com.

* cited by examiner

WIRELESS VEHICLE SERVICING

CROSS-REFERENCE TO RELATED APPLICATIONS

This application is a continuation of U.S. application Ser. No. 12/773,997 filed May 5, 2010, now U.S. Pat. No. 8,498,771, the disclosure of which is incorporated in its entirety by reference herein.

TECHNICAL FIELD

One or more embodiments relate to servicing of a vehicle. In some embodiments, the servicing may be wireless vehicle servicing. In some further embodiments, the wireless vehicle servicing may be based on diagnostic standards.

BACKGROUND

Various examples of wireless vehicle diagnostics are presently known in the art.

U.S. Pat. No. 6,778,888 issued to Cataldo et al. discloses a system and method for automated collection of data from a transportation vehicle having a wireless transmitter connected to a diagnostic service bus. The wireless transmitter is in communication with a server for processing and displaying the collected data.

U.S. Pat. No. 7,155,321 issued to Bromley et al. discloses a remote vehicle diagnostics, monitoring, configuration and reprogramming tool. The system includes a fleet of vehicles equipped with wireless mobile communications means that enable fleet managers to remotely diagnose, monitor and reprogram vehicles in their fleet via an Internet Web-based browser environment. Each vehicle within the fleet is equipped with a smart device that is coupled to the data bus within each vehicle. Data commands relating to the vehicle's parameters are sent and received using satellite and terrestrial wireless communications technology. Users remotely perform total fleet logistics and eliminate the need to physically bring fleet vehicles to a repair, maintenance or configuration facility.

U.S. Patent Application Publication No. 2009/0177352 discloses a vehicle diagnosis system for ascertaining, storing, and transmitting diagnosis data from control units in a motor vehicle to a computer outside of the motor vehicle. The diagnosis system has components which are inside of the vehicle and components which are outside of the vehicle. The onboard components are capable of autonomously requesting diagnosis data from control units, buffer-storing the diagnosis data and of transmitting the diagnosis data to offboard components. The offboard components can be used to configure the onboard components, to visually display the transmitted data and to forward the data to subsequent systems. Access is effected using a communication module, which is preferably implemented in a diagnosis control unit with a dedicated gateway and which is not the control unit for the central locking A gateway for diagnosis applications is present in the vehicle in the case of vehicles with a diagnosis CAN bus or with another diagnosis bus.

U.S. Patent Application Publication No. 2006/0253235 to Bi et al. discloses a method of wireless communication with a device. The method includes accessing diagnostic information associated with the device and providing the diagnostic information over an air interface.

SUMMARY

One aspect relates to a computer-implemented method for remote vehicle servicing. The computer-implemented method may include receiving on a servicing terminal instructions for performing a vehicle servicing operation. The vehicle servicing operation may include, but is not limited to vehicle diagnostics, vehicle module software/firmware updates, and vehicle key reprogramming.

The method may further include receiving vehicle servicing operation data based on the instructions and one or more data communication rules for communicating data to a vehicle computing system. The data communication rules may include rules relating to transporting the servicing request data packet over a communication channel compatible with the vehicle computing system. The communication channel or mode may be BLUETOOTH, cellular, or 802.11 communication.

The vehicle servicing operation data may include rules for conforming to a servicing standard for vehicle servicing including, but not limited to, the J-2534 standard.

The method may further include generating servicing request data stored in computer-readable media. Computer-readable media may include RAM and/or a buffer. The servicing request data may include the vehicle servicing operation data and the one or more data communication rules. The servicing request data may be transmitted to the vehicle computing system and servicing return data may be received from the vehicle computing system. Servicing status information may be presented audibly, textually, or visually on the servicing terminal based on the servicing return data.

In some embodiments, the method may further include receiving over the data communication channel the servicing request data at the vehicle computing system which may be in communication with one or more vehicle modules over a vehicle network. A service to perform may be determined based on the servicing request data. Data may be exchanged over the vehicle network based on the service. The method may further include receiving servicing status data to obtain servicing return data. The servicing return data may be transmitted over the communication channel to the servicing terminal.

The servicing request data may include an authorization key for validating that the vehicle servicing operation is authorized. Validation of the authorization key may be performed onboard of the vehicle computing system or offboard of the vehicle computing system.

The method may further include receiving input from a user defining at least one of the vehicle servicing operations to be performed.

The method may further include processing the servicing return data on the servicing terminal to obtain the servicing status information.

Another aspect may include a computer program product for remote vehicle servicing. The computer program product may include instructions for receiving on a servicing terminal input for performing a vehicle servicing operation, receiving vehicle servicing operation data, and receiving one or more data communication rules for communicating data to a vehicle computing system. Based on the input, the computer-program product may further include instructions for transmitting to the vehicle computing system the vehicle servicing operation data based on the one or more data communication rules. The computer-program product may further include instructions for receiving from the vehicle computing system servicing return data. Servicing status information may be presented on the servicing terminal based on the servicing return data.

The computer program product may further include instructions for establishing communication with a vehicle information server having a vehicle information database.

The vehicle information database may including servicing operation data. The servicing operation data may be received from the vehicle information database. The vehicle servicing operation data may include data relating to at least one of vehicle diagnostics, vehicle module software/firmware updates, and vehicle key reprogramming.

In one embodiment, the servicing return data may include vehicle diagnostic trouble codes. The computer program product may further includes instructions for receiving one or more diagnostic data definitions from the vehicle information database for correlating with the diagnostic trouble codes. The diagnostic data definitions may be correlated with the vehicle diagnostic trouble codes for presentation on the service terminal.

Another aspect may include a vehicle servicing system comprising a servicing computer. The servicing computer may be configured to receive vehicle servicing data and rules for data communication with a vehicle computing system (VCS). The servicing computer may be further configured to transmit vehicle servicing request data based on the data communication rules and the vehicle servicing data. The servicing computer may be further configured to receive servicing return data and obtain servicing status information based on the servicing return data. The servicing status information may be presented to a user.

In one embodiment, the VCS may be configured to retrieve rules for communication with the servicing computer. The return servicing data may include the data communication rules. The servicing computer may be further configured to receive the return servicing data based on the data communication rules.

These and other aspects will be better understood in view of the attached drawings and following detailed description.

BRIEF DESCRIPTION OF THE DRAWINGS

The figures identified below are illustrative of some embodiments of the invention. The figures are not intended to be limiting of the invention recited in the appended claims. The embodiments, both as to their organization and manner of operation, together with further object and advantages thereof, may best be understood with reference to the following description, taken in connection with the accompanying drawings, in which:

DETAILED DESCRIPTION

Detailed embodiments of the invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

Figure 1:
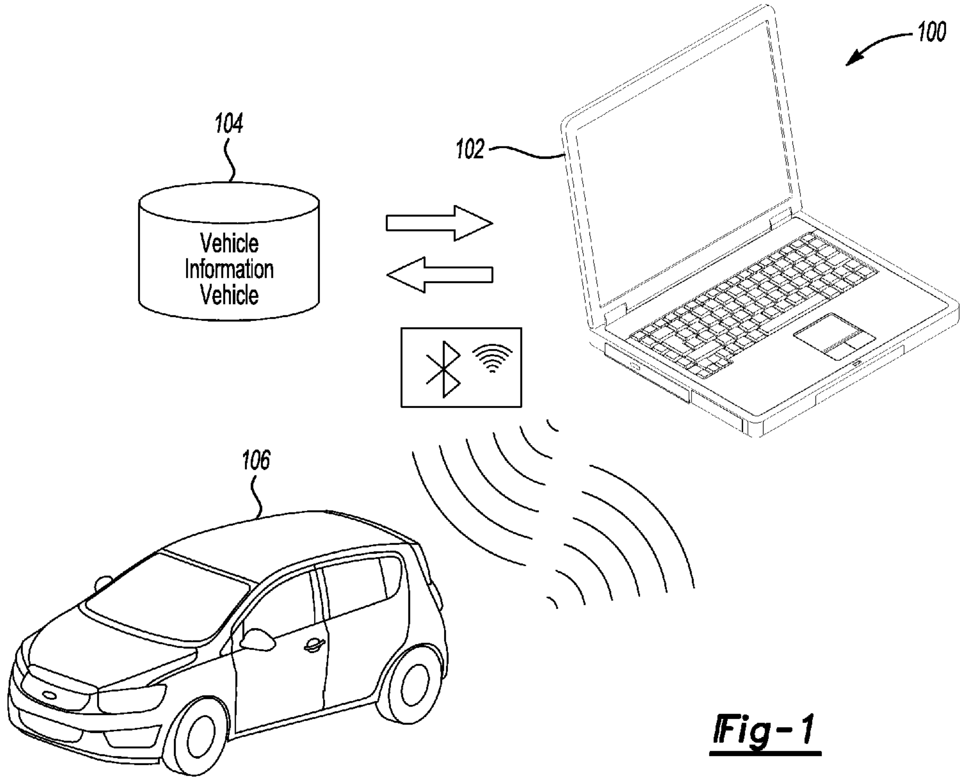
FIG. 1 illustrates an exemplary architecture of a wireless vehicle service system.

FIG. 1 illustrates an illustrative example of a wireless servicing system. It will be appreciated that the disclosure and arrangement of FIGS. 1-6 may be modified or re-arranged to best fit a particular implementation of the various embodiments of the invention.

A client terminal 102 (which may also be referred to as a "diagnostic terminal") may be any personal computer (e.g., desktop or laptop) or handheld, nomadic device (e.g., PDA, mobile phone, etc.). Client terminal 102 may have installed diagnostic software for performing, processing, and presenting diagnostic information to a user at client terminal 102. The software may be installed via physical storage mediums (e.g., CD-ROM, USB, memory card, etc.) and/or wirelessly (e.g., and without limitation over an Internet, Intranet, WAN, or LAN connection). The installed software may be fully independent diagnostic program modules and/or sub-modules (e.g., and without limitation dynamic link libraries or DLLs) communicating with other software programs. It should be understood that the software is not limited to a particular configuration. For example, the diagnostic software may be implemented as a single module or a number of modules communicating with each other. Further details of the diagnostic software will be described below with respect to FIG. 2.

Client terminal 102 may also communicate (over a wired or wireless connection) with a vehicle information database 104 via a server (not shown) on which the database 104 may be implemented. The vehicle information database 104 may include vehicle information such as diagnostic information about the vehicle. More specifically, database 104 may include diagnostic data definitions of the diagnostic data from a vehicle 106 (e.g., diagnostic trouble codes, i.e., DTC). The diagnostic data definitions may be displayed to the user from terminal 102. Other non-limiting information that may be included in database 104 may include vehicle software/firmware updates and programming/re-programming information (e.g., for vehicle keys). It will be appreciated, however, that database 104 may include other vehicle related information. In one embodiment, the vehicle information may be organized according to a vehicle information number (VIN).

A user may include, but is not limited to, a vehicle owner, dealership, and/or a vehicle service shop. In one embodiment, the user may require authorization (e.g., and without limitation, a username and password or other suitable login information) in order to access data from the vehicle information database 104. Accordingly, database 104 may be a secure database. The user authorization information may be provided by an OEM or other entity responsible for managing database 104. In some embodiments, the user authorization information may be given to the user when access subscription fees are paid by the user.

As will be further described below, diagnostic information may be exchanged between client terminal 102 and a vehicle 106 for diagnosing one or more vehicle concerns. Non-limiting examples of communication modes include wireless, such as BLUETOOTH, an 802.11 standard communication (WiFi, WiMax, etc.), radio frequency (RF) transmission, and cellular, and/or wired, including electrical communication. Other communication modes may be used without departing from the scope and spirit of the invention.

Figure 2:
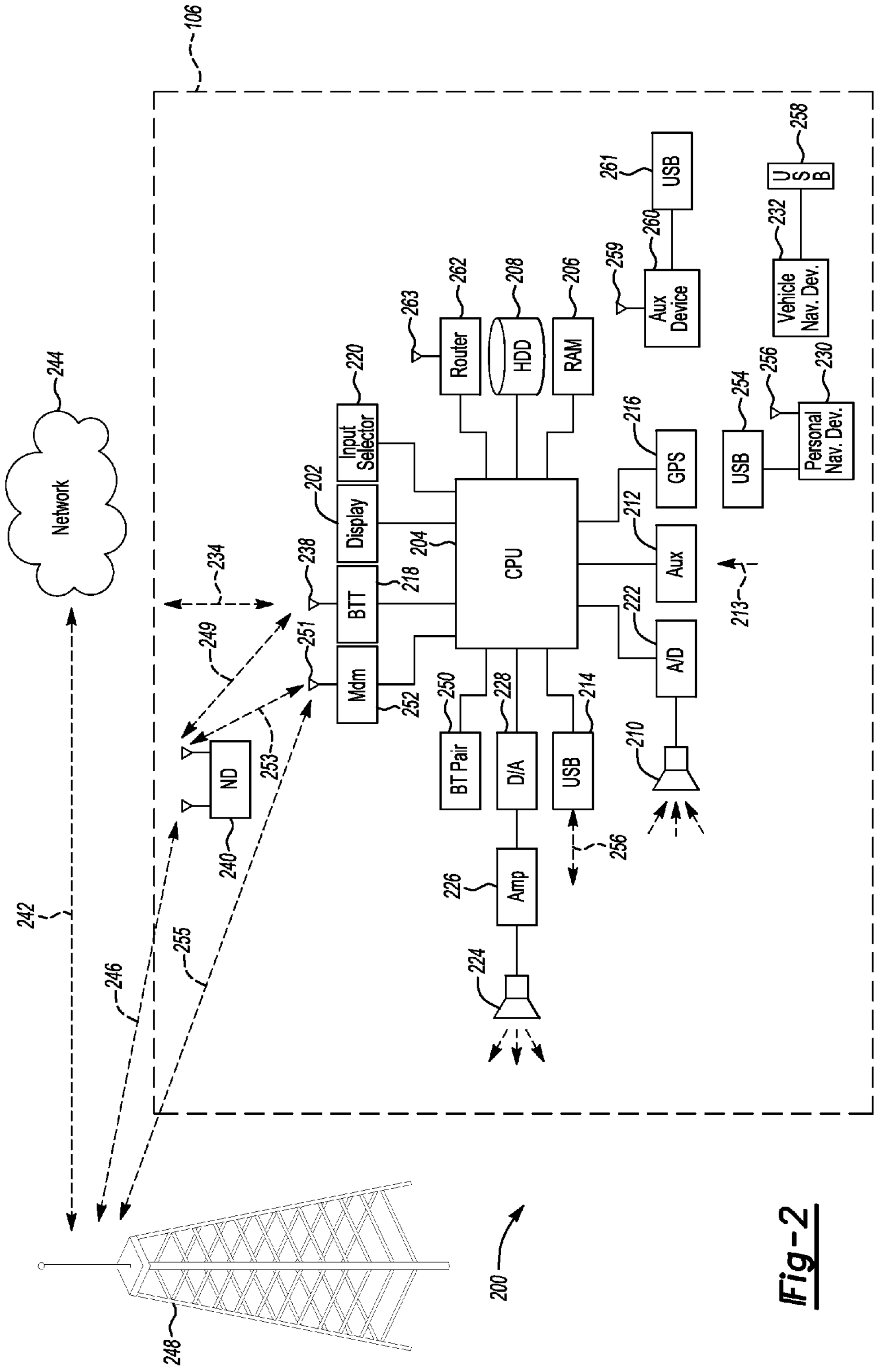
FIG. 2 illustrates a block topology of a vehicle computing system that operates as a part of the wireless vehicle service system of FIG. 1.

The vehicle 106 may be outfitted with a vehicle computing system (VCS) that serves as a gateway for diagnosing one or more vehicle concerns at terminal 102. FIG. 2 illustrates a block topology of the vehicle computing system.

A vehicle enabled with the vehicle computing system may contain a visual front end interface 202 located in the vehicle. The user may also be able to interact with the interface if it is provided, for example, with a touch sensitive screen. In another illustrative embodiment, the interaction occurs through, button presses, audible speech and speech synthesis.

In the illustrative embodiment shown in FIG. 2, a processor 204 controls at least some portion of the operation of the VCS 200. Provided within the vehicle 106, the processor 204 allows onboard processing of commands and routines. Further, the processor 204 is connected to both non-persistent 206 and persistent storage 208. In this illustrative embodiment, the non-persistent storage 206 is random access memory (RAM) and the persistent storage 208 is a hard disk drive (HDD) or flash memory.

The processor 204 is also provided with a number of different inputs allowing the user to interface with the processor. In this illustrative embodiment, a microphone 210, an auxiliary input 212 (for input 213), a USB input 214, a GPS input 216 and a BLUETOOTH input 218 are all provided. An input selector 220 is also provided, to allow a user to swap between various inputs. Input to both the microphone 210 and the auxiliary connector 212 is converted from analog to digital by a converter 222 before being passed to the processor.

Outputs to the system may include, but are not limited to, a visual display 202 and a speaker 224 or stereo system output. The speaker 224 may be connected to an amplifier 226 and may receive its signal from the processor 204 through a digital-to-analog converter 228. Output can also be made to a remote BLUETOOTH device such as PND 230 or a USB device such as vehicle navigation device 232 along the bi-directional data streams shown at 234 and 236, respectively.

In one illustrative embodiment, the system 200 uses the BLUETOOTH transceiver 218 to communicate 238 with a user's nomadic device 240 (e.g., cell phone, smart phone, PDA, etc.). The nomadic device 240 can then be used to communicate 242 with a network 244 outside the vehicle 106 through, for example, communication 246 with a cellular tower 248.

Exemplary communication between the nomadic device 240 and the BLUETOOTH transceiver 218 is represented by signal 249.

Pairing a nomadic device 240 and the BLUETOOTH transceiver 218 can be instructed through a button 250 or similar input. Accordingly, the CPU 204 is instructed that the CPU 204 that the onboard BLUETOOTH transceiver 218 will be paired with a BLUETOOTH transceiver (not shown) in a nomadic device 240.

Data may be communicated between CPU 204 and network 244 utilizing, for example, a data-plan, data over voice, or DTMF tones associated with nomadic device 240. Alternatively, it may be desirable to include an onboard modem 252 having antenna 251 in order to communicate 253 data between CPU 204 and network 244 over the voice band. The nomadic device 240 can then be used to communicate 242 with a network 244 outside the vehicle 106 through, for example, communication 246 with a cellular tower 248. In some embodiments, the modem 252 may establish communication 255 with the tower 248 for communicating with network 244. As a non-limiting example, modem 252 may be a USB cellular modem and communication 255 may be cellular communication.

In one illustrative embodiment, the processor 204 is provided with an operating system including an API to communicate with modem application software. The modem application software may access an embedded module or firmware on the BLUETOOTH transceiver 218 to complete wireless communication with a remote BLUETOOTH transceiver (such as that found in a nomadic device).

In another embodiment, nomadic device 240 includes a modem for voice band or broadband data communication. In the data-over-voice embodiment, a technique known as frequency division multiplexing may be implemented when the owner of the nomadic device 240 can talk over the device while data is being transferred. At other times, when the owner is not using the device, the data transfer can use the whole bandwidth (300 Hz to 3.4 kHz in one example).

If the user has a data-plan associated with the nomadic device 240, it is possible that the data-plan allows for broadband transmission and the system could use a much wider bandwidth (speeding up data transfer). In still another embodiment, nomadic device 240 may be replaced with a cellular communication device (not shown) that is installed to vehicle 106. In yet another embodiment, the ND 240 may be a wireless local area network (LAN) device capable of communication over, for example (and without limitation), an 802.11g network (i.e., WiFi) or a WiMax network.

In one embodiment, incoming data can be passed through the nomadic device 240 via a data-over-voice or data-plan, through the onboard BLUETOOTH transceiver 218 and into the vehicle's internal processor 204. In the case of certain temporary data, for example, the data can be stored on the HDD 208 or other storage media until such time as the data is no longer needed.

Additional sources that may interface with the VCS 200 include a personal navigation device 230, having, for example, a USB connection 254 and/or an antenna 256, a vehicle navigation device 232, having a USB 258 or other connection, an onboard GPS device 216, or a remote navigation system (not shown) having connectivity to network 244.

Further, the CPU may be in communication with a variety of other auxiliary devices 260. These devices can be connected through a wireless 259 or wired 261 connection (such as a USB connection). Also, or alternatively, the CPU 204 may be connected to a vehicle based wireless router 262, using for example a WiFi transceiver 263. This could allow the CPU 204 to connect to remote networks in range of the local router 262.

Figure 3:
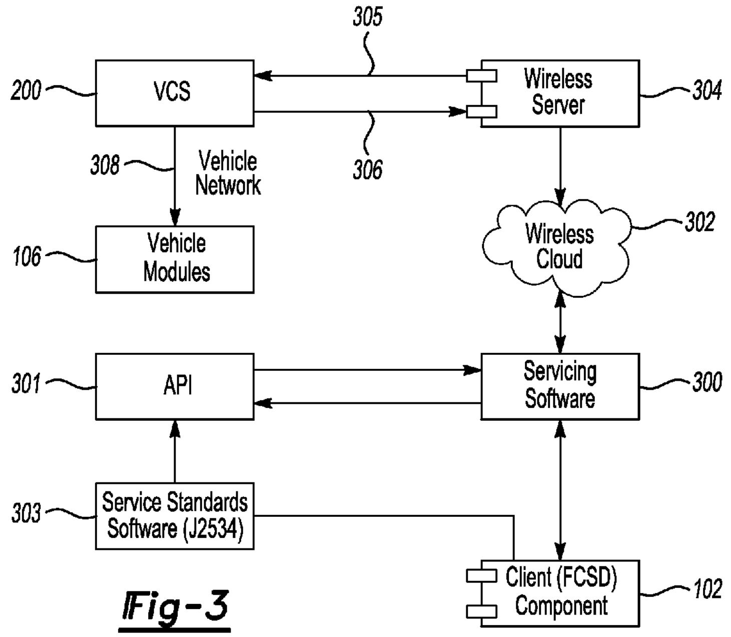
FIG. 3 illustrates a block architecture of the wireless vehicle service system of FIG. 1 according to one of the various embodiments.
Figure 4:
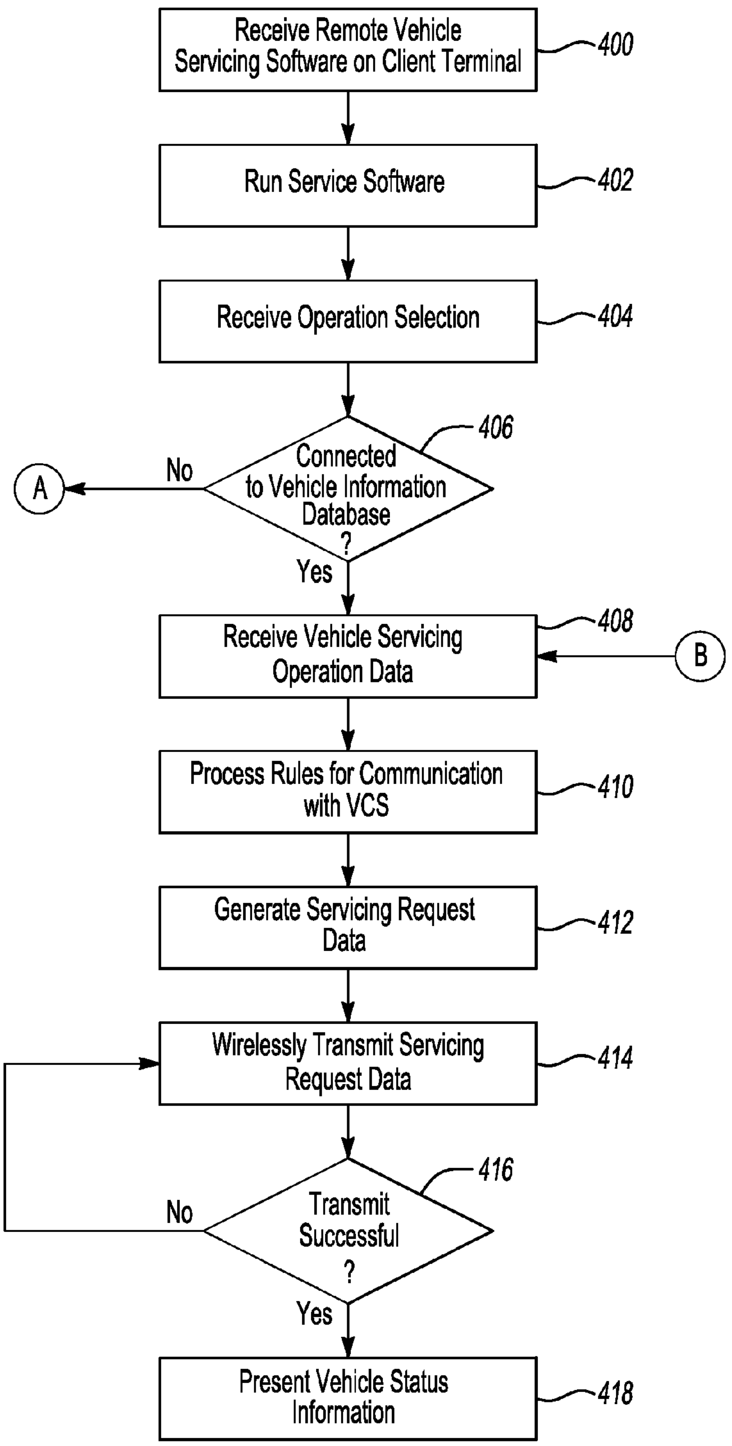
FIG. 4 illustrates one non-limiting aspect of the operation of the wireless vehicle service system according to one of the various embodiments.
Figure 5:
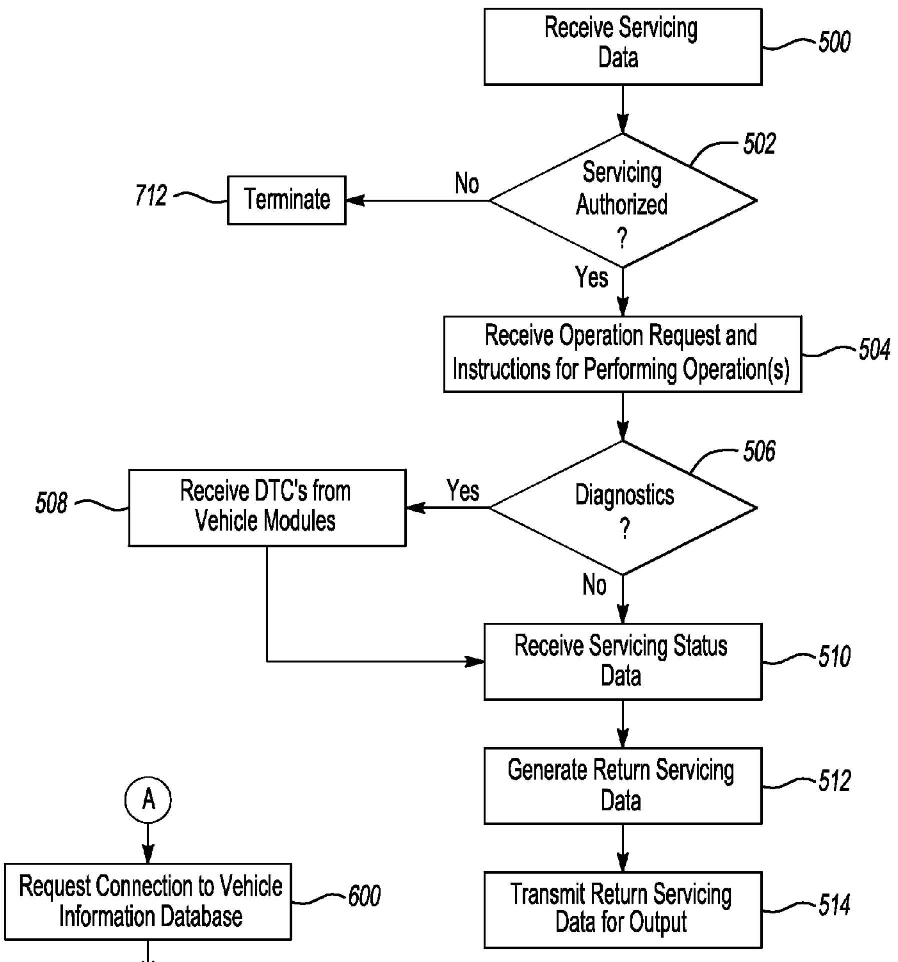
FIG. 5 illustrates another non-limiting aspect of the operation of the wireless vehicle service system according to one of the various embodiments.

The vehicle servicing system 100 may be utilized by a user when attempting to address one or more vehicle concerns for a vehicle. FIGS. 3-5 provide further details on the data exchange process between a client terminal 102 and the vehicle (i.e., the VCS 200) for addressing these vehicle concerns. It should be understood that the operation of the vehicle servicing system is not limited to occur on a system having the architecture illustrated in FIG. 1. For example, and without limitation, all or most of the operation may occur onboard the vehicle (e.g., and without limitation, on the VCS 200). As another example, while terminal 102 is illustrated in the Figures as an offboard component, the system may be modified such that terminal 102 is an onboard component in the vehicle and, accordingly, at least part of the operation is performed in the vehicle.

Referring now to FIGS. 3 and 4, vehicle servicing software 300 may be installed on the client terminal 102 (block 400). In one embodiment, the software 300 may be installed via a physical storage medium or wirelessly prior to or upon first use of the servicing software 300. The software 300 may be obtained from a vehicle dealership, an OEM, or a third party (such as a vehicle service shop) and stored on a physical medium. In some embodiments, the software 300 may be obtained from a third-party application provider such as the APPLE STORE, BLACKBERRY APP WORLD or ITUNES. In further embodiments, the software 300 may be downloaded to the client terminal 102 (e.g., and without limitation, over the Internet) from a website.

As described above, software 300 may be a self-sufficient program, a sub-module communicating with other programs, or combinations thereof. In one embodiment, software 300 is implemented in client 102 as a dynamic link library (DLL). One of ordinary skill in the art will know and understand the function and operation of DLLs.

In one embodiment, the client terminal 102 may include an application programming interface (API) 301 for communicating with a program 303 that defines specific standards by which vehicle diagnostic must take place. In some countries (such as the United States), these standards may be mandated by a government agency (such as the Environmental Protection Agency) so that vehicle diagnostics may be standardized for all vehicle diagnosticians, from individuals to vehicle dealerships. One example of such a standard is the J2534 standard defined by the Society of Automotive Engineers (SAE). These standards may be implemented in the program 303 as diagnostic rules that are used to request diagnostic information from a vehicle.

As illustrated in block 402, the servicing software 300 may be run or loaded from terminal 102. The software 300 may be user activated or called by another program (e.g., another diagnostic program).

The diagnostic software 300 may offer a number of different servicing operations. Non-limiting examples of such servicing operations may include vehicle diagnostics, updating vehicle modules (software/firmware), and programming (e.g., key reprogramming). Accordingly, the software 300 may receive an operation selection input from the user selecting one or more of servicing operations (block 404). The user input may or may not be in response to a request from the software 300 for the user to input a service operation selection.

In one embodiment, information for performing the service operation and other vehicle information may be received from the vehicle information database 104. Accordingly, the software 300 may determine if a connection is available with the vehicle information database 104 (block 406). If a connection is not available, the software 300 (via terminal 102) may connect to the vehicle information database 104 (the server (not shown) on which the database is implemented) as represented by circle block A and illustrated in FIG. 6.

Figure 6:
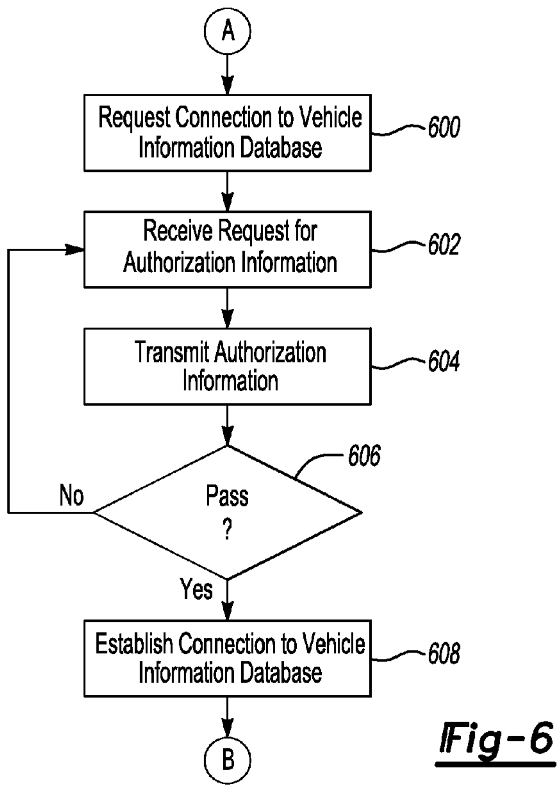
FIG. 6 illustrates the operation for communicating with a vehicle information database.

Referring to FIG. 6, a request to connect to the vehicle information database 104 may be transmitted from the terminal 102 (block 600). The request may be transmitted manually (e.g., via user action) or automatically.

In one embodiment, the user may need to be authorized before access to the vehicle information database 104 is granted. Accordingly, a request for authorization information may be transmitted from the server housing database 104 and received at terminal 102 (block 602). Non-limiting examples of authorization information may include any secure way of identifying an authorized user (e.g., and without limitation, a username and password). The user may input authorization information and the authorization information may be transmitted to the server for access to database 104 (block 604).

As illustrated in block 606, the authorization information may be validated. If the authorization information is not recognized (or does not pass), another request for authorization information may be received at terminal 102 and the information re-transmitted (block 604). If the authorization information is valid (or passes), the connection to the database is established (607). The process may then continue at circle block B (FIG. 4). It should be understood that a database connection may be established at anytime that is suitable for the various contemplations of the invention.

If and when a connection to the database 104 is established (block 406), the software 300 may retrieve vehicle servicing operation information based on the vehicle servicing operation selected (block 408). For example, if the user selected module updates, update patches may be retrieved from the vehicle information database 104. As another non-limiting example, reprogramming information for reprogramming the vehicle to recognize a key or reprogramming information for reprogramming a key can be obtained from the vehicle information database 104. As another non-limiting example (which will be described in further detail below), diagnostic data definitions may also be retrieved from the database 104. The diagnostic data definitions may be definitions of diagnostic trouble codes (DTCs) received from the vehicle.

Retrieving vehicle servicing operation information (block 408) may also include retrieving the servicing compliance rules from the vehicle servicing standards program 303 via the API 301 (described above) for transmission to the VCS 200. The servicing compliance rules may apply to all vehicle servicing operations. Thus, once the software 300 is activated, the software 300 may communicate with the API 301 at client terminal 102 in order to retrieve the servicing compliance rules from the vehicle servicing standards program 303. The servicing information that is retrieved by the software 300 may be buffered in memory (not shown) of the client terminal 102 until the information is transmitted to the VCS 200.

Prior to transmission, the servicing operation information may be packetized for transmission as a data packet to the VCS 200 (block 412). Other data may also be included in the data packet(s). For example, and without limitation, software 300 may also packet communication rules for communicating data packets to the VCS 200 (block 410). Non-limiting examples may include BLUETOOTH profile information, wireless internet protocol (IP) addresses, a cellular device number, a network address (i.e., a media access control address), and other like information. The communication rules may also include rules on obtaining access to the VCS 200 and its services (e.g., authorization information for unlocking diagnostic services). The VCS communication rules may be received by calling other software program(s), from the client terminal memory (not shown), or the rules may be hard programmed to the software 300. It should be understood that these examples of obtaining communication rules are non-limiting. Further, it will be appreciated that other vehicle servicing related and non vehicle servicing related data may be included in the data packet(s) without departing from the scope and spirit of the various embodiments.

The servicing operation information and the communication rules may be packetized by the software 300 to generate a servicing data packet(s) (block 412). The data packet(s) may be held at the terminal 102 until transmission of at least one of the data packets. In one embodiment, the data packet(s) may be stored in memory (e.g., non-persistent/volatile memory such as RAM). Additionally or alternatively, the data packet(s) may be held in a buffer (not shown) of the terminal 102. It should be understood that the data packet(s) may be held in other suitable computer-readable media of terminal 102 without departing from the scope and spirit of the various embodiments.

The servicing data packet(s) may be wirelessly transmitted to the VCS 200 (block 414) through wireless cloud 302. In one embodiment, the servicing data packet(s) may be transmitted using a specific protocol designed for the VCS 200.

The wireless cloud 302 may include, but is not limited to, BLUETOOTH, an 802.11 wireless standard (WiFi, WiMax, etc.), cellular and/or RF communication. In one embodiment, a BLUETOOTH enabled remote terminal 102 may communicate with the VCS 200 within a certain radius of the wireless cloud 302. In one non-limiting embodiment, the radius may be 32 feet.

As illustrated in block 416, a determination may be made whether the transmission was successful. If not, the servicing data packet may be re-transmitted (block 414). In some embodiments, the servicing data packet(s) may be re-transmitted a predetermined number of times. If data packet(s) are not successfully transmitted, the transmission may terminate.

If the transmission is successful, software at terminal 102 (which may or may not be software 300) may wait for a response from the vehicle 106 with service information. The service information may be a return data packet including the diagnostic vehicle data (e.g., DTCs) and/or a servicing status. Once the return data packet is received and processed at terminal 102, the service information may be output from terminal 102 (block 418). Output may include, but is not limited to a graphical, audible, or tactile output. Further details of the return data packet and the processing of the data for output will be described below.

FIG. 5 illustrates the operation of the wireless vehicle servicing system on the vehicle 106 (via the VCS 200). Again, reference will be made with respect to FIG. 3 in describing the operation illustrated in FIG. 5. The servicing data packet from the terminal 102 may be received by the VCS 200 via the wireless cloud 302 (block 500).

The VCS 200 may be outfitted with a wireless server 304 (FIG. 3) which may understand and implement diagnostic identifiers (i.e., diagnostic parameters, also known as DID) and DTC requests from the terminal 102. Accordingly, in one embodiment, wireless server 304 may receive the service data packet(s) from the terminal 102. The wireless server 304 may be a BLUETOOTH server or 802.11 server. In some embodiments, the wireless server 304 may not be a physical component of the VCS 200, but a "service" implemented in the wireless cloud 302.

Requests to, and responses from, the vehicle 106 may be exchanged securely over a secured connection 305 between the wireless server 304 and the VCS 200. In one embodiment, the exchanged data may be encrypted.

Figure 7:
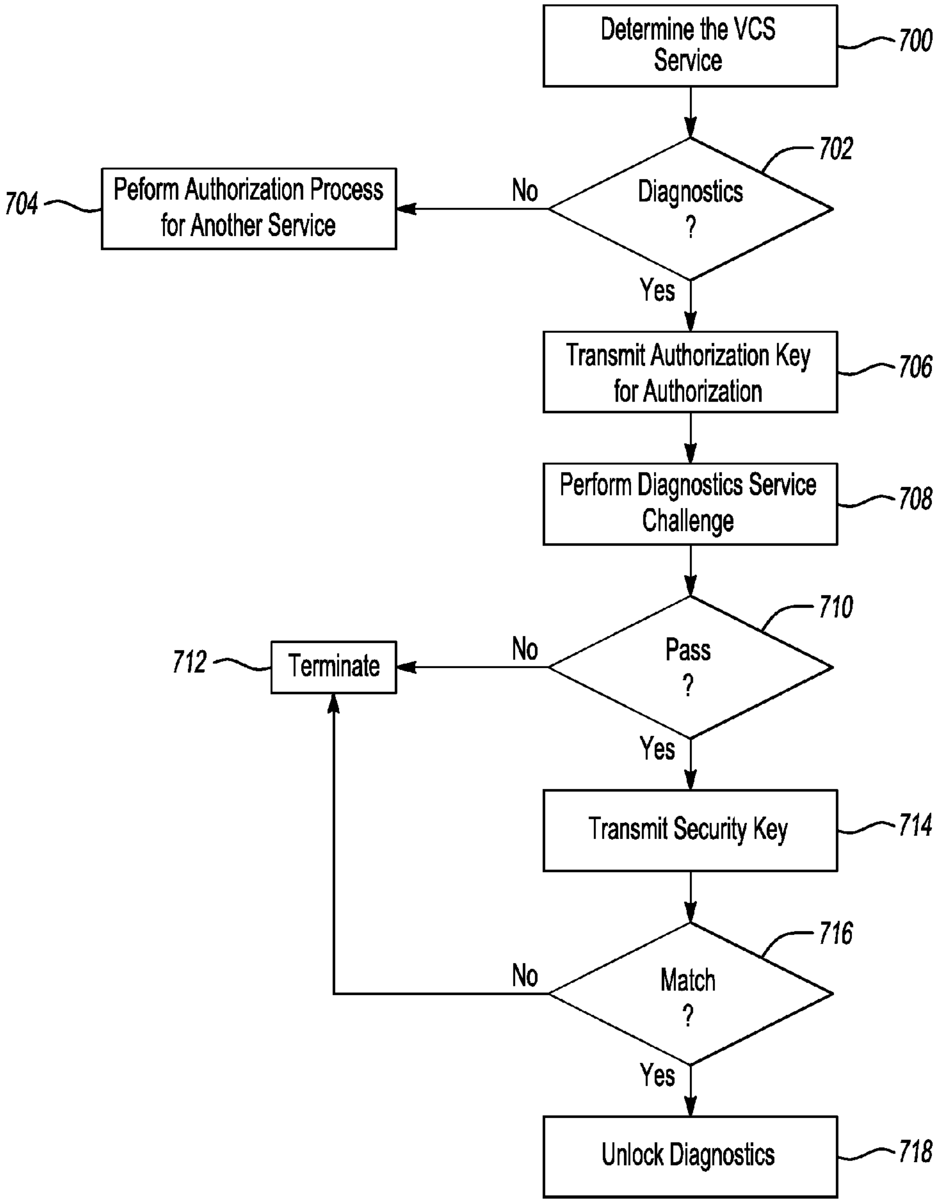
FIG. 7 illustrates an authorization process for accessing a diagnostic service from the vehicle computing system of FIG. 2.

In one embodiment, when data is transmitted to the VCS 200 for accessing the various services from the VCS 200 (e.g., diagnostics), the data may first need to be authorized as permitted to access the one or more service of the VCS 200. Thus, an authorization process may be performed at the vehicle 106 (block 502). In one embodiment, the authorization process may be performed by an authorization module (not shown) in the VCS 200. FIG. 7 illustrates a non-limiting example of the VCS service authorization process.

As illustrated in block 700, the VCS service that is being accessed may be identified. In this case, a determination is made whether the diagnostics service is being access (block 702). Although FIG. 7 illustrates that a determination may be made whether a diagnostic service is being accessed (block 702), the operation is not limited to making this determination. The determination may relate to any service, however, other services fall outside of the scope of the invention. As such, if the diagnostics service is not being accessed, then the authorization process may be performed for the other service(s) (block 704).

The servicing data transmitted from the terminal 102 may include an authorization key for unlocking the diagnostics service. In one embodiment, this authorization key may be one of the VCS communication rules packetized at the terminal 102 for transmission to the vehicle 106. Upon determining that the diagnostics service is being accessed, the authorization key may be retrieved and transmitted for validation (block 706) onboard or offboard. Where the validation is offboard, the authorization key and validation may be transmitted to/from an offboard authorization system via network 244. In one embodiment, the offboard authorization system may be hosted and operated by an OEM.

The authorization key validation process may include a "challenge" operation for validating the authorization key (block 708). Non-limiting examples of such "challenge" operations may include performing a look-up in an authorization database, determining if a correlation exists between the transmitted authorization key and the valid authorization key, determining if a match exists between the transmitted authorization key and the valid authorization key, or other suitable validation techniques. A successful challenge may result in the generation and/or receipt of a security key for transmission to the VCS 200.

Based on the validation process, a validation/pass result may be transmitted to the VCS 200 (block 710). If the authorization key does not pass the validation process, the process may terminate (block 712). If the authorization key is validated, the security key may be transmitted to the VCS 200 (block 714).

As illustrated in block 716, an additional validation process may occur at the VCS 200. The VCS 200 may store (e.g., and without limitation, in RAM 206) a security key corresponding to the security key received as part of the authorization process described above. Accordingly, the VCS 200 may determine if the security keys correspond. In one embodiment, validating the security keys may include a similar challenge process as described above.

If the security key is not validated, the process may terminate (block 712). Otherwise, the servicing/diagnostics service on the VCS 200 may be accessed (or unlocked) (block 718).

Referring back to FIG. 5, after receiving/unpacking the servicing data packet (block 500), the servicing operation request ("unpacked" from the servicing data packet) may be received (block 504) at the VCS 200 (e.g., and without limitation, by wireless server 304). In addition, instructions may be received to perform one or more vehicle servicing operations.

In one embodiment, a determination may be made as to what service operation(s) is being requested (block 506). As illustrated in FIG. 5, a determination may be made whether vehicle diagnostics is being requested. It should be understood, however, that this determination should not be interpreted as a default (or the initial) determination made by the VCS 200. Rather, the arrangement of FIG. 5 is for illustration and explanation and that the determination in block 506 may be made for any one of the service operation based on the request.

If the request is for vehicle diagnostics, the VCS 200 may receive one or more diagnostic trouble codes (DTC) from the vehicle modules by communicating with the one or more vehicle modules over a vehicle network 308 (block 508). One or more data packets may be generated and packaged at the VCS 200 which may include the one or more DTCs as part of servicing status data in the data packet(s) transmitted to terminal 102 (block 510). The data packet(s) may be held at the terminal VCS 200 until transmission of at least one data packets. In one embodiment, the data packet(s) may be stored in memory (e.g., non-persistent/volatile memory such as RAM 206). Additionally or alternatively, the data packet(s) may be held in a buffer (not shown) of the VCS 200. It should be understood that the data packet(s) may be held in other suitable computer-readable media of VCS 200 without departing from the scope and spirit of the invention.

Otherwise, if the service operation is not vehicle diagnostics, the servicing status of the other operation(s) may be received during and/or upon completion of the servicing operation according to the request (block 510). For example, where the request is for a software/firmware update, the update request may be received and the update data may be transmitted to the software/firmware. The status of this update may be received as data for packaging in the return servicing data packet.

Some or all of the status data may be packaged (block 512) in data packet(s) and transmitted (block 514) to the terminal 102 as servicing return data packet(s). It should be understood that the return servicing data packet(s) may include at least some of the same information as the servicing request data packet(s) described above. As a non-limiting example, the return data packet(s) may include the communication rules for data communication between the VCS 200 and the terminal 102.

As described above, the data from the return servicing data packet(s) may be extracted and processed at terminal 102 and the servicing status may be output from the terminal 102. The output may be used to address vehicle concerns and/or as confirmation of the vehicle servicing process. The data from the return servicing data packet(s) may be processed for output by a single service/diagnostic software module housed in terminal 102 (e.g., software 300) or by a combination of the diagnostic and servicing software modules in terminal 102.

While exemplary embodiments are illustrated and described above, it is not intended that these embodiments illustrate and describe all possibilities. Rather, the words used in the specification are words of description rather than limitation, and it is understood that various changes may be made without departing from the spirit and scope of the invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:

a processor configured to:

access a remote vehicle database in response to a vehicle system servicing request;

obtain vehicle software module update information, for updating a current vehicle software configuration, from the database, corresponding to a specific, identified, vehicle;

obtain communication rules for communicating with the identified vehicle; and using the communication rules to establish communication with the identified vehicle, package and transmit the software module update information to the vehicle.

2. The system of claim 1, wherein the software module update information is for a plurality of software modules.

3. The system of claim 1, wherein the software module update information includes a current vehicle software configuration.

4. The system of claim 1, wherein the processor communicates with the vehicle through a wireless device wirelessly connected to the vehicle.

5. The system of claim 1, wherein the communication rules include authorization information.

6. The system of claim 1, wherein the processor communicates with the vehicle through a local wireless network.

7. A computer-implemented method comprising:

accessing a remote vehicle database in response to a vehicle system servicing request entered at a local terminal;

obtaining vehicle software module update information, for updating a current vehicle software configuration, from the database, corresponding to a specific, identified, vehicle;

obtaining communication rules for communicating with the identified vehicle; and using the communication rules to establish communication with the identified vehicle, packaging and transmitting the software module update information to the vehicle.

8. The system of claim 7, wherein the software module update information is for a plurality of software method.

9. The method of claim 7, wherein the software module update information includes a current vehicle software configuration.

10. The method of claim 7, wherein the local terminal communicates with the vehicle through a wireless device wirelessly connected to the vehicle.

11. The method of claim 7, wherein the communication rules include authorization information.

12. The method of claim 7, wherein the local terminal communicates with the vehicle through a local wireless network.

13. A non-transitory computer readable storage medium storing instructions that, when executed by a processor, cause the processor to perform a method comprising:

accessing a remote vehicle database in response to a vehicle system servicing request;

obtaining vehicle software module update information, for updating a current vehicle software configuration, from the database, corresponding to a specific, identified, vehicle;

obtaining communication rules for communicating with the identified vehicle; and using the communication rules to establish communication with the identified vehicle, packaging and transmitting the software module update information to the vehicle.

14. The system of claim 13, wherein the software module update information is for a plurality of software modules.

15. The system of claim 13, wherein the software module update information includes a current vehicle software configuration.

16. The system of claim 13, wherein the processor communicates with the vehicle through a wireless device wirelessly connected to the vehicle.

17. The system of claim 13, wherein the communication rules include authorization information.

18. The system of claim 13, wherein the processor communicates with the vehicle through a local wireless network.

* * * * *